United States Patent
Dimitroff et al.

(10) Patent No.: US 9,591,148 B2
(45) Date of Patent: Mar. 7, 2017

(54) DETECTING PROXIMITY OF DEVICES BASED ON TRANSMISSION OF INAUDIBLE SOUND SIGNATURES IN THE SPEECH BAND

(71) Applicant: Cisco Technology, Inc., San Jose, CA (US)

(72) Inventors: Michael P. Dimitroff, Sunnyvale, CA (US); Michael A. Ramalho, Lakewood Ranch, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/680,354

(22) Filed: Apr. 7, 2015

(65) Prior Publication Data

US 2016/0301810 A1 Oct. 13, 2016

(51) Int. Cl.
*H04M 19/04* (2006.01)
*G01S 3/80* (2006.01)

(52) U.S. Cl.
CPC ............. *H04M 19/041* (2013.01); *G01S 3/80* (2013.01)

(58) Field of Classification Search
CPC ....... G01S 3/80; H04M 19/041; H04M 3/567; H04M 3/568; H04H 2201/90; H04H 60/45
See application file for complete search history.

(56) References Cited

U.S. PATENT DOCUMENTS

| | | | |
|---|---|---|---|
| 8,212,854 B2 | 7/2012 | Marton et al. | |
| 8,738,763 B2* | 5/2014 | Crystal | G06Q 30/02 709/201 |
| 2013/0106975 A1 | 5/2013 | Chu et al. | |
| 2013/0106976 A1 | 5/2013 | Chu et al. | |
| 2013/0106977 A1 | 5/2013 | Chu et al. | |
| 2013/0108076 A1 | 5/2013 | Chu et al. | |
| 2014/0164629 A1 | 6/2014 | Barth et al. | |
| 2015/0172878 A1* | 6/2015 | Luna | H04W 4/12 455/412.2 |

OTHER PUBLICATIONS

"IT Glossary—Automatic Content Recognition (ACR)", Gartner, http://www.gartner.com/it-glossary/, Retrieved Dec. 16, 2014, 2 pages.
Bruce Davis, "Signal Rich Art: Enabling the vision of Ubiquitous Computing", SPIE Proceedings vol. 7880: Media Watermarking, Security, and Forensics III, Feb. 8, 2011, 11 pages.

(Continued)

*Primary Examiner* — Fanghwa Wang
(74) *Attorney, Agent, or Firm* — Edell, Shapiro & Finnan, LLC

(57) ABSTRACT

A communication device detects sound with a microphone to produce a sound signal representative of the sound and searches the sound signal for unique inaudible sound signatures associated with a group identifier. Each sound signature identifies a respective communication device. Each sound signature is in an audible frequency band but masked to be imperceptible. If any of the sound signatures are determined to be present in the sound signal, the communication device selects one based on predetermined criteria associated with the group identifier.

18 Claims, 7 Drawing Sheets

(56) References Cited

OTHER PUBLICATIONS

Lopes et al, "Aerial Acoustic Communications", IEEE, Applications of Signal Processing to Audio and Acoustics, 2001 IEEE Workshop on the, Oct. 2001, 4 pages.

Modegi, "Detection Method of Mobile Terminal Spatial Location Using Audio Watermark Technique", ICROS-SICE International Joint Conference 2009, Fukuoka International Congress Center, Japan, Aug. 2009, 6 pages.

* cited by examiner

DETECTING PROXIMITY OF DEVICES BASED ON TRANSMISSION OF INAUDIBLE SOUND SIGNATURES IN THE SPEECH BAND

TECHNICAL FIELD

The present disclosure relates to detecting the proximity of devices based on sound transmissions.

BACKGROUND

The proximity of various communication devices that transmit energy to a reference communication device that receives that energy may be detected at the reference communication device based on the received energy. The reference communication device may receive radio frequency (RF) signals, ultrasound signals, and sound signals that are perceptible to human hearing, such as voice signals, from the other communication devices. The reference communication device typically includes application modules that subject the received energy to signal processing, such as RF demodulation, echo cancellation, and voice recognition that renders the received energy, in whatever form, unavailable, unsuitable, or not easily accessible for use in proximity detection algorithms. The received energy may not readily convert to physical proximity. Moreover, the application modules may be inaccessible or otherwise difficult to modify so as to incorporate the proximity detection algorithms. In such environments, proximity detection may only be implemented as a complex "work-around" of, or an "add-on" to, existing signal processing/application modules and can, therefore, be expensive and less effective than desired.

DESCRIPTION OF EXAMPLE EMBODIMENTS

Overview

A communication device detects sound with a microphone to produce a sound signal representative of the sound. The communication device searches the sound signal for unique inaudible sound signatures associated with a group identifier. Each sound signature identifies and is assumed to be transmitted by a respective communication device among a group of communication devices also associated with the group identifier. Each sound signature is in an audible frequency band of human hearing but masked to be imperceptible to human hearing. If any of the sound signatures are determined to be present in the sound signal, the communication device selects a sound signature determined to be present in the sound signal based on predetermined criteria associated with the group identifier.

Example Embodiments

Figure 1:
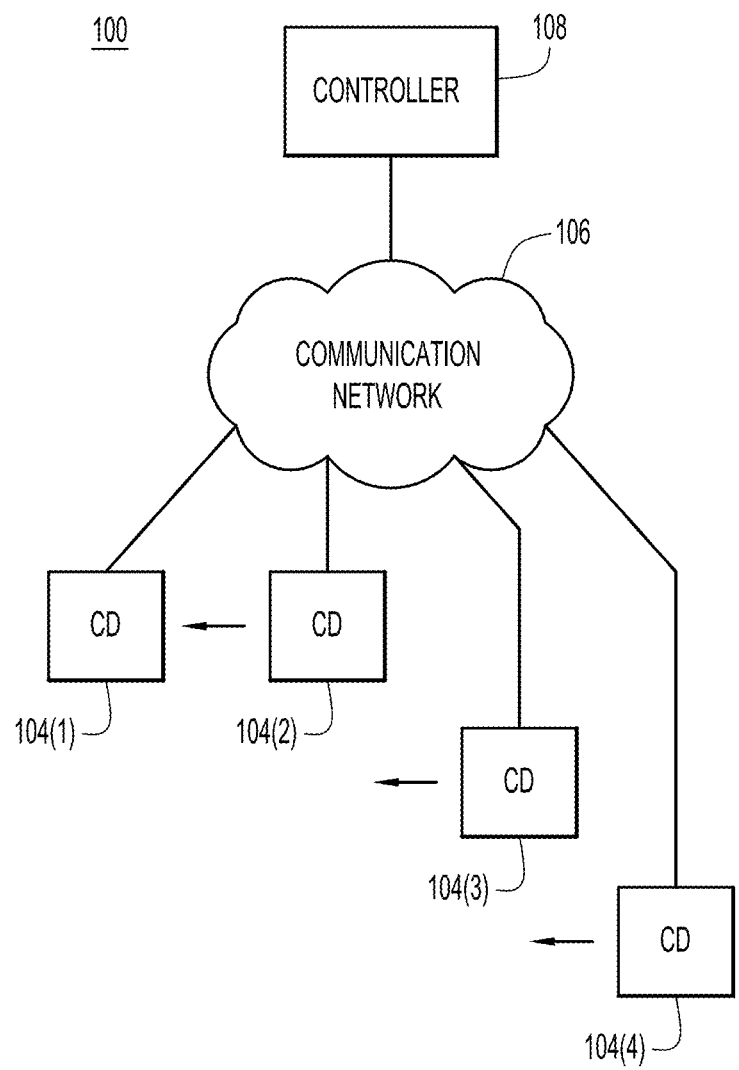
FIG. 1 is a block diagram of a proximity detection system in which a reference communication device may detect the proximity of other communication devices based on inaudible sound signatures transmitted from the other communication devices, according to an example embodiment.

With reference to FIG. 1, there is depicted a block diagram of a proximity detection system 100 in which techniques to detect the proximity of communication devices relative to a reference communication device may be implemented, according to an example embodiment. System 100 includes a group of communication devices 104(1)-104(4) each connected to, or able to connect to, a communication network 106, which may include one or more wide area networks (WANs), such as the Internet, one or more local area networks (LANs), and one or more cellular networks. System 100 may also include a central controller 108 to configure and control the group of communication devices 104 and other groups of communication devices (not shown in FIG. 1). Communication devices 104 may include, but are not limited to, devices configured to provide audio and/or video connections with each other via network 106. For example, communication devices 104 may include tablet computers, personal computers, laptop computers, and mobile phones, such as smartphones, and video conference endpoints. Only 4 communication devices 104 are depicted in FIG. 1, but more or less communication devices may be used in other examples.

In the example of FIG. 1, communication devices 104(2)-102(4) include loudspeakers to transmit sound energy, and communication device 104(1) (the "reference communication device") includes a microphone to detect the sound energy transmitted by those of communication devices 104(2)-104(4) (i.e., the "other" communication devices) that are within an acoustic range of reference communication device 104(1) (i.e., are proximate the reference communication device). According to embodiments presented herein and described below, reference communication device 104(1) processes sound detected by its microphone to detect unique inaudible sound signatures therein and that are indicative of which of communication devices 104(2)-104(4) are transmitting those sound signatures in proximity to the reference communication device.

Figure 2:
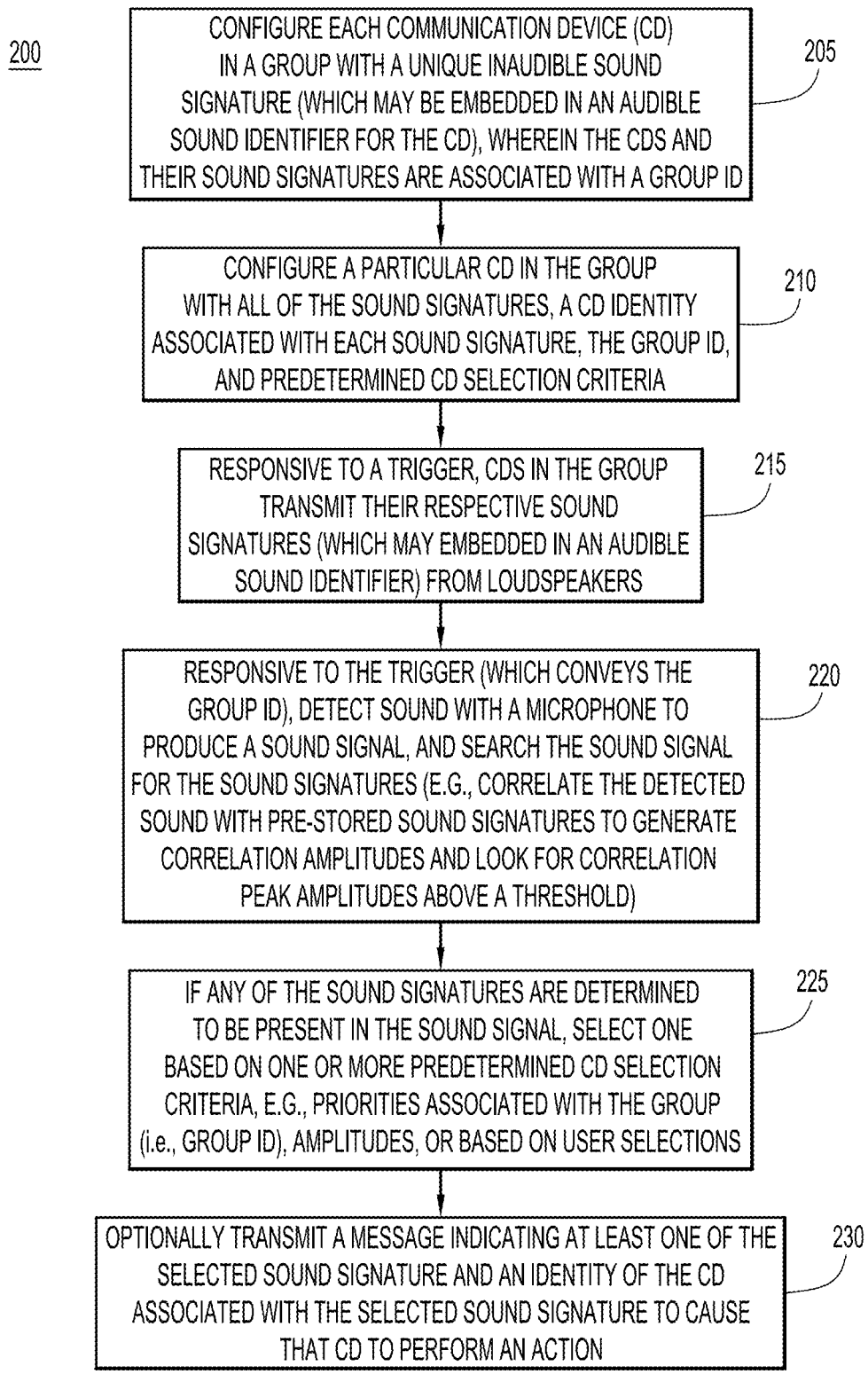
FIG. 2 is a flowchart of a method of detecting the proximity of the other communication devices depicted in FIG. 1 using inaudible sound signatures transmitted from the other communication devices, according to an example embodiment.

With reference to FIG. 2, there is a flowchart of a method 200 of detecting at reference communication device 104(1) which of the other communication devices 104(2)-104(4) are proximate to the reference communication device based on inaudible sound signatures transmitted from the other communication devices.

At 205, controller 108 connects with and configures the group of communication devices 104 via communication network 106. Controller 108 configures each communication device (CD) 104(i) in the group with a unique inaudible sound signature that is embedded in an audible sound identifier for that CD. The audible sound identifiers, the unique inaudible sound signatures embedded in the audible sound identifiers, and the CDs 104 are associated with a unique group identifier (ID), which is common across the CDs. Other groups of CDs and their respective audible sound identifiers and inaudible sound signatures are associated with other unique group IDs.

The audible sound identifier configured on each CD 104(i), e.g., a ringtone/announcement or other audible sound identifier, has a frequency spectrum within an audible frequency band of human hearing and is perceptible to human hearing when played by/transmitted from a loudspeaker of the CD. The unique inaudible sound signature embedded in the audible sound identifier also has a frequency spectrum in the audible frequency band of human hearing, but is masked to be imperceptible to human hearing when played by/transmitted from the loudspeaker of the CD along with the audible sound identifier. The inaudible sound signature is not recognized as speech or voice in a conventional speech/voice detector. The inaudible sound signature may be sound masked to be inaudible/imperceptible to human hearing using any known or hereafter developed sound masking technique, for example, the sound signature may be temporally masked or spectrally masked, as would be appreciated by one of ordinary skill in the relevant arts having read the present description. In some embodiments, the embedded inaudible sound signature may be an inaudible sound watermark embedded in the audible sound identifier, such that the audible sound identifier is considered an inaudibly watermarked audible sound identifier.

At 210, controller 108 also configures reference CD 104(1) (also referred to herein as a "particular one" of CDs 104) with: all of the unique inaudible sound signatures and audible sound identifiers configured on CDs 104(2)-104(4); a CD identity/identifier of each of CDs 104(2)-104(2) associated with each unique inaudible sound signature; the group ID, and predetermined CD selection criteria (described below). Since each unique inaudible sound signature is associated with, i.e., mapped to, a corresponding one of the CD identifiers, the sound signature itself, once detected, becomes an identifier of a CD, i.e., the detected sound signature identifies the CD that transmitted the sound signature. The predetermined selection criteria may be a list of CD priorities form low to high, each assigned to a corresponding one of CDs 104.

At 215, a trigger is received at each of the CDs 104. The trigger may be a call announcement for an incoming audio or video call to CDs 104 that contains the group ID. The trigger may also be a periodic timer event, e.g., timer timeout, in each of CDs 104 as used in a "normally silent" embodiment, described below. Responsive to the trigger, each of CDs 102(2)-102(4) transmits from a local loudspeaker of the CD the audible sound identifier and unique inaudible sound signature embedded in the audible sound identifier that is configured on the CD.

At 220, also responsive to the trigger, reference CD 104(1) (i.e., the particular one of CDs 104) detects sound with a local microphone to produce a sound signal, i.e., the microphone transduces sound into the sound signal (the transduced sound). Reference CD 104(1) searches the sound signal for any unique inaudible sound signature associated with the group ID. To do this in one embodiment, CD 104(1) correlates the sound signal with each of the unique inaudible sound signature associated with the group ID that were configured on CD 104(1) to produce correlation amplitudes (measured amplitudes) that the CD stores in its local memory. CD 104(1) searches the correlation amplitudes for any correlation amplitude peaks above a threshold indicative of the presence of a unique inaudible sound signature in the sound signal, and declares the sound signature present if the corresponding correlation peak exceeds the threshold. Any known or hereafter developed technique to correlate the preconfigured unique inaudible sound signatures with the sound signal may be used, as would be appreciated by one of ordinary sill in the relevant arts.

At 225, if any of the unique inaudible sound signatures are determined to be present (i.e. are detected) in the sound signal, CD 104(1) selects one of the detected unique inaudible sound signatures (i.e., one of the sound signatures determined to be present). If multiple sound signatures are detected, CD 104(1) may select the detected sound signature based on one or more predetermined criteria. For example, CD 104(1) may select the detected sound signature associated with the highest measured amplitude among the measured amplitudes of sound signatures declared to be present. In another example, CD 104(1) may select the sound signature associated with (i.e., that identifies) the CD having the highest priority. In yet another example, CD 104(1) may select the detected sound signature based on both the amplitudes and priorities of the detected sound signatures. In an even further example, CD 104(1) may present a user of the CD with the ability to select any of the sound signatures of the group of CDs 104, whether detected or not. If only one sound signature is detected, CD 104(1) may select that sound signature. If no sound signature is detected, CD 104(1) may select itself.

In an optional operation 230, CD 104(1) transmits a message indicating the selected unique sound signature, the identity of the CD associated with that sound signature, or both to network 108. In one embodiment, the message may be transmitted wirelessly as a radio frequency (RF) signal to network 108. In another embodiment, CD 104 may transmit the message to network 108 through a wired connection with the network. The transmission of this message directly or indirectly causes the CD associated with the selected unique inaudible sound signature to perform an action, such as answer an incoming call that was addressed to all of CDs 104, as will be described further below.

In another "normally silent" embodiment, the unique inaudible sound signatures configured on CDs 104 are not embedded in audible sound identifiers. In other words, the sound signatures are "stand-alone" sound signatures. In this embodiment, CDs 104(2)-104(4) transmit their respective unique inaudible sound signatures in the absence of accompanying audible sound. For example, the unique inaudible sound signatures may be spread spectrum sound signatures similar to background noise that is imperceptible to human hearing. CDs 104(2)-104(4) may transmit their stand-alone sound signatures periodically, every 5-10 seconds, for example, responsive to a timer timeout (mentioned above in connection with operation 215). The stand-alone signatures are designed to present a "noise level" when transmitted from a loudspeaker that is lower than environmental/background noise, but at least high enough to be detected by the microphone and sound signal processing of reference CD 104(1) (which detects the stand-alone sound signature). Thus, CD 104(1) may periodically search for any "stand-alone" sound signatures in the sound signal from the microphone to detect which of CDs 104(2)-104(4) in the CD group are proximate CD 104(1).

Figure 3:
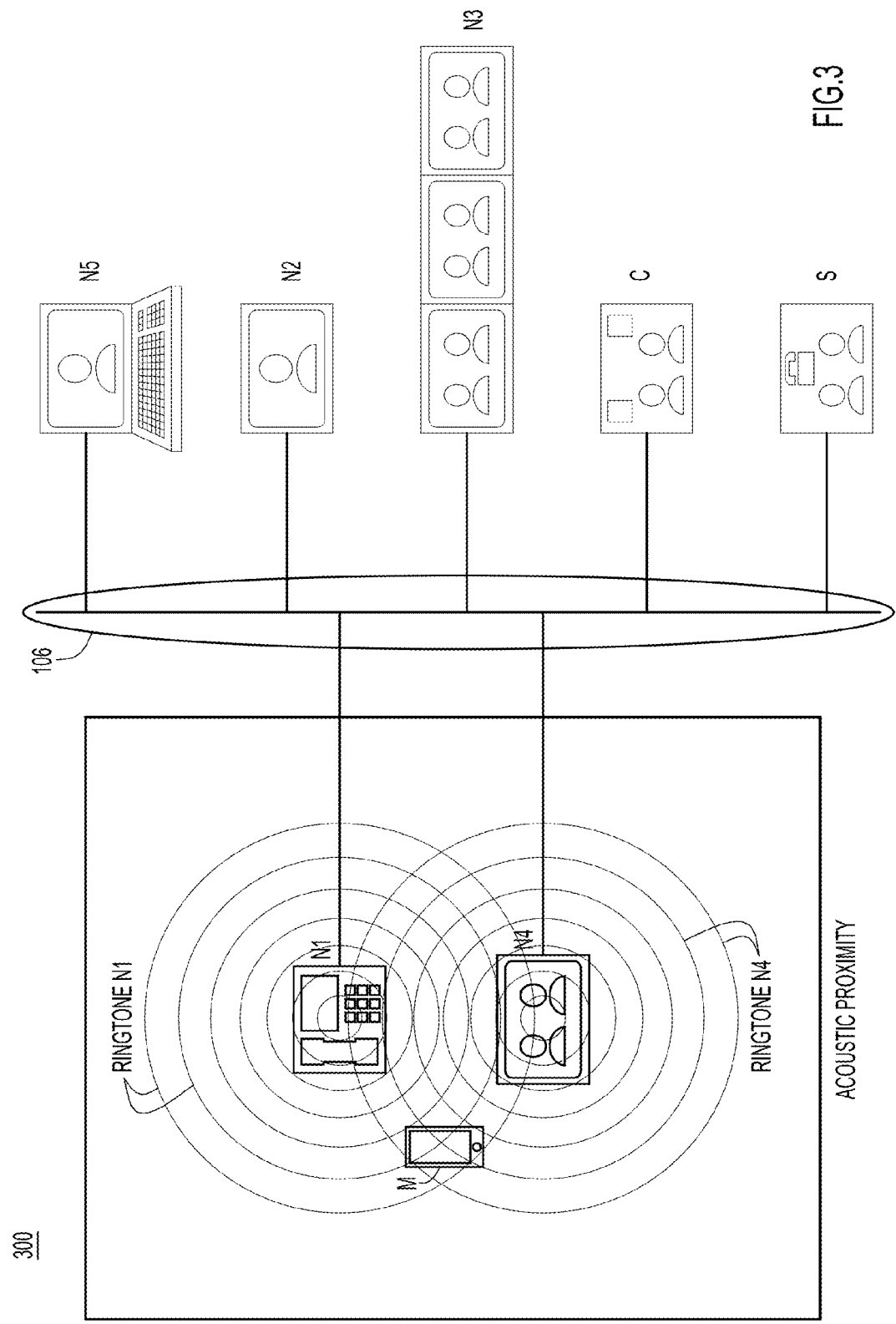
FIG. 3 is a block diagram of a call system in which embodiments described herein to answer an incoming audio or video call on an appropriate communication device proximate a reference communication device may be implemented, according to an example embodiment.

With reference to FIG. 3, there is a block diagram of a call system 300 in which techniques described herein may be implemented to answer an incoming audio or video call on an appropriate CD proximate a reference CD among a group of CDs. System 300 incorporates concepts and features described above in connection with FIGS. 1 and 2. System 300 includes CDs M and N1-N5 belonging to a group of CDs, a central server C, and call control server S that are able to communicate with each other over network 106. A user of system 300 uses/operates CDs M and N1-N5 and subscribes to call-related services on central server C and call control server S.

In an example, CD M may be a mobile phone corresponding to reference CD 104(1) in FIG. 1, while CDs N1-N5 may be video conference endpoints or portable computers corresponding to CDs 104(2)-104(4). CDs M and N1-N5 are each able of answering, engaging in, and terminating audio or video calls. Also, CDs N1-N5 are each able to play/transmit respective unique inaudible sound signatures configured thereon through/from their local loudspeakers, and CD M includes a microphone to detect sound.

Central server C maintains a database of: user accounts; CDs associated with the user accounts; audible sound identifiers associated with the CDs; and unique inaudible sound signatures associated with the CDs. An example user account record stored in central server C is described below in connection with FIG. 4. Central server C may access the aforementioned information in the databases and transmit the information to any of CDs M and N1-N5, or call control server S, via network 106.

Call control server S includes signaling applications that communicate with CDs M and N1-N5 over one or more real-time media protocols, such as the Session Initiation Protocol (SIP) or the H.323 standard from the ITU Telecommunication Standardization Sector (ITU-T) to provide audio-visual communication sessions on a packet network. Call control server also manages set-up and tear-down of audio or video calls with respect to CDs M and N1-N5.

Figure 4:
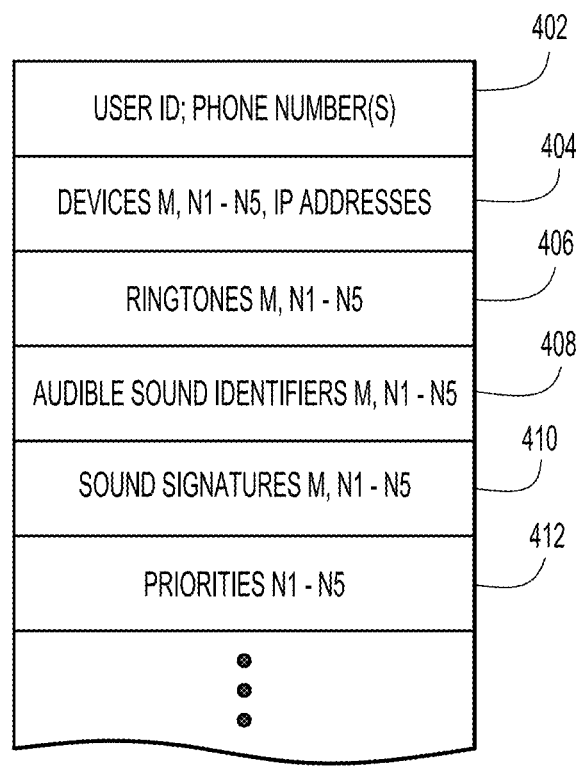
FIG. 4 is an illustration of a user account record stored in a database of a central server in the call system of FIG. 3, according to an example embodiment.

With reference to FIG. 4, there is an illustration of a user account record 400 stored in the database of central server C. User record 400 includes a user account ID 402, which may also serve as a group ID. Record 400 includes a field 404 that lists CDs M, and N1-N5 in the group of CDs associated with user account ID/group ID 402, and Internet Protocol (IP) addresses corresponding to each of the CDs in the group. Record 400 also includes audible sound identifiers (e.g., ringtones) 408 (e.g., in .WAV or other audio file formats), unique inaudible sound signatures 410 (also in .WAV or other audio file formats), and priorities 412 associated with at least CDs N1-N5. The database will include many records similar to record 400 corresponding to the many users/groups subscribed to services provided by system 300.

Figure 5:
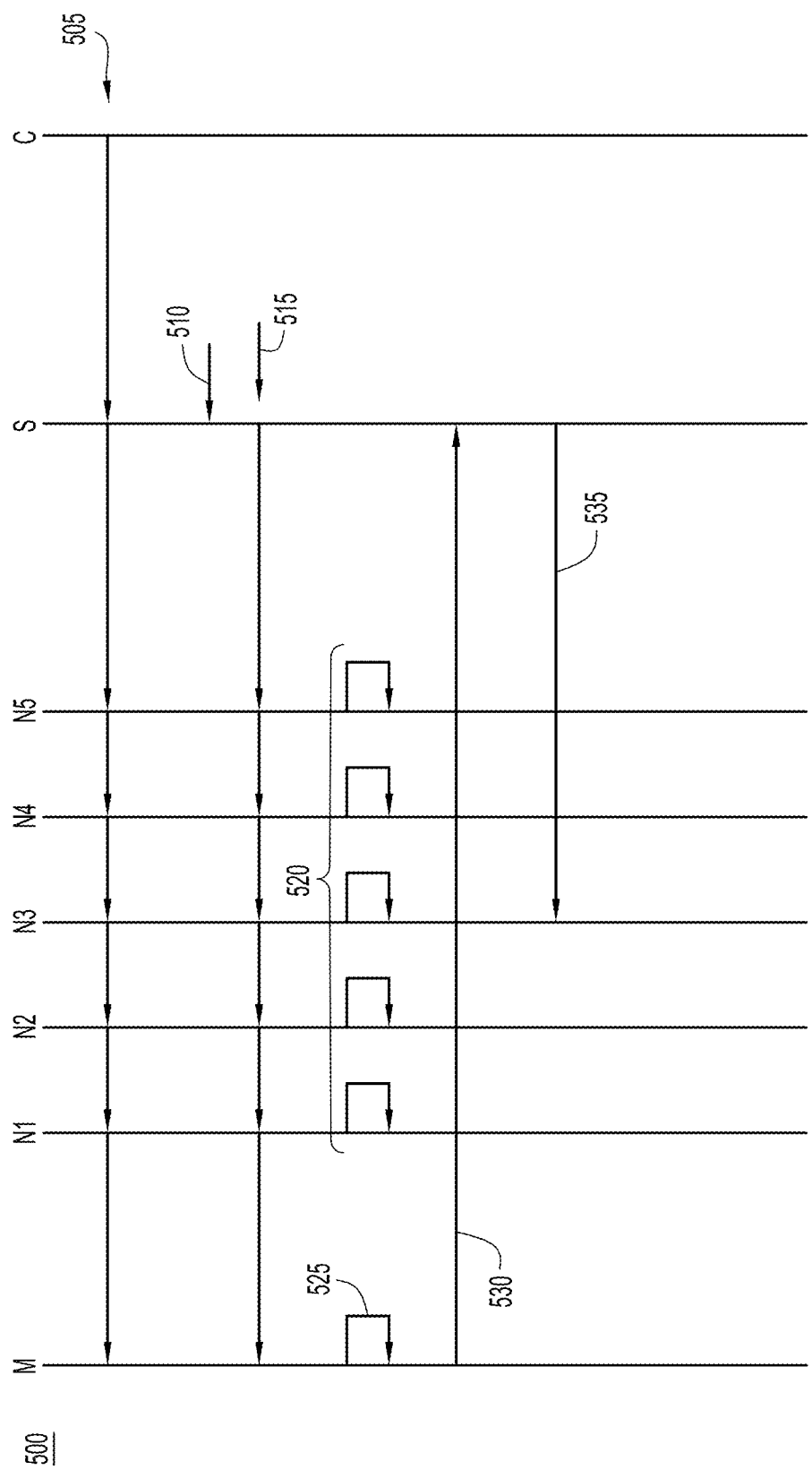
FIG. 5 is a message transaction diagram for configuring and operating the system of FIG. 3, according to an example embodiment.

With reference to FIG. 5, there is a message transaction diagram 500 for configuring and operating call system 300 according to proximity detection techniques presented herein.

At an a priori configuration operation 505, central server C configures each of CDs N1-N5 in the group of CDs (which also includes CD M) with an audible ringtone having embedded therein a unique inaudible sound signature over network 106. Server C may also configure reference CD M with a ringtone. Server C may perform the configure operation responsive to a request by a user associated with CD M received over network 106. In an example, using CD M, the user sends a message to server C instructing the server to generate audible ringtones embedded with unique inaudible sound signatures for each of CDs N1-N5. The audible ringtones may be the same ringtone, i.e., common across all CDs N1-N5, but the sound signature embedded therein is unique for each of the CDs. Server C associates each audible ringtone and its unique inaudible sound signature with the one of CDs N1-N5 to be configured with that sound, and then downloads that sound to that CD.

In an alternative embodiment in which one or more CDs are not equipped with software that allows central server C to directly configure them with ringtones embedded with unique inaudible signatures ($3^{rd}$ party devices), the user may use an application hosted on C to embed an arbitrary ringtone with a unique inaudible sound signature. As part of that procedure, the user will be asked which CD should that signature be associated with, and C will write the association in its database. The user will then be able to download the watermarked ringtone from C, and transfer it to the desired CD using its native interface for changing ringtones.

Server C also assigns priorities to CDs N1-N5, for example, in a descending order of priority/preference=(N3, N4, N1, N2, N5). The priorities may be established in any number of ways with or without the involvement of various ones of servers C and S and CD M. In one example, the priorities may be established responsive to user requests submitted to server C via CD M or via a web browser hosted on a personal computer, and so on. Server C keeps in its database the priorities, the association of unique inaudible sound signatures with specific CDs, and the group ID associated with the group of CDs M and N1-N5 to CD M.

At 510, call control server S receives an incoming call identifying a destination telephone number that is common across the group of CDs M and N1-N5, i.e., common to the group ID associated with the group of CDs M and N1-N5. The incoming call may identify the CD group, or the telephone number may be mapped to the group ID in central server C, which is accessible to call control server S. Call control server S may request certain information related to the group of CDs M and N1-N5 from central server C, e.g., IP addresses, the associated group ID, and the like.

At 515, call control server S sends a call announcement to each of CDs M and N1-N5 in the group to announce the call and identify the group (i.e., the call announcement includes the group ID or information from which the group ID may be derived).

At 520, responsive to the call announcement, each of CDs N1-N5 plays the audible ringtone and embedded inaudible sound signature from its local loudspeaker. In one embodiment of call system 300, all CDs N1-N5 play (or are instructed to play) their respective ringtones and embedded inaudible sound signatures substantially concurrently. In another embodiment, CDs N1-N5 play (or are instructed to play) their respective ringtones and embedded inaudible sound signatures one at a time, e.g., sequentially, so that the individual sound signatures do not interfere with each other and are thus more easily detected/decoded. There are different ways to control CDs N1-N5 to play their respective ringtones and embedded sound signatures one at a time, as would be appreciated by one of ordinary skill in the relevant arts.

At 525, responsive to the call announcement, CD M generates an alert to announce the call, which may include playing a ringtone or displaying a call indicator. Also, CD M listens for sound transmitted from nearby CDs, i.e., from sound transmitted by CDs N1-N5 within acoustic range of CD M. To do this, CD M detects sounds with its local microphone to produce a sound signal and searches the sound signal for unique inaudible sound signatures embedded in audible ringtones. In the example of FIG. 5, CD M detects unique inaudible sound signatures only for proximate CDs N1 and N4. CD M may display a list of the CDs N1 and N2 associated with the detected signatures. Since more than one of CDs N1-N5 was detected by CD M, CD M may select one of the detected CDs (e.g., N1 or N4) to answer the incoming call in any number of ways.

In one embodiment to select one of the detected CDs, CD M consults the assigned priorities for CDs N1-N4 and, because CD N4 has a higher priority than CD N1, selects higher priority CD N4 to answer the incoming call. In another embodiment to select one of the detected CDs, CD M: (i) prioritizes the detected CDs according to amplitude measurements associated with the detected sound signatures identifying the detected CDs, such that a higher amplitude has a higher priority than a lower amplitude; and (ii) selects the detected CD based on the prioritized amplitudes (e.g., CD M selects the detected CD associated with a highest amplitude). In yet another embodiment to select one of the detected CDs, CD M selects the detected CD based on both amplitude and assigned priorities. For example, CD M may first sort a list of the detected CDs (sound signatures) based on measured amplitudes associated with the detected sound signatures, and then sort that list based on assigned priorities. The above-described selection may be made automatically by CD M. In another embodiment, CD M may display a list of all CDs in the group (e.g., all of CDs N1-N5), any of which may be selected by a user to answer the incoming call. Such a list may indicate (i) the CDs detected in the vicinity or M (e.g., N1 and N4 may be highlighted on the list to indicate their detected proximity), and (ii) the priorities associated with all of the CDs on the list (which may be based on amplitude and/or assigned priority). The CD may provide the user with the ability to manually select any of the listed CDs (the CDs in the group) to answer the call, including CDs that were not detected in the vicinity of CD M. In addition, the user may select CD M (itself) to answer the call, or may elect not to answer the call at all.

At 530, CD M sends a message to call control server S identifying the detected unique sound signature for whichever CD was selected to answer the incoming call at 525 along with the CD ID for that CD. For example, if CD N4 was selected to answer the call, CD M sends a message to call control server S identifying the detected unique sound signature for CD N4 along with the CD ID for CD N4.

At 535, responsive to the message from CD M, call control server S directs the selected CD to answer the incoming call and cancels all other legs of the call. For example, assuming that CD N4 was selected to answer the incoming call, call control server S directs CD N4 to answer the call and cancels the legs of the call to CDs M, N1-N3, and N4.

If, at 525, CD M had not detected any of CDs N1-N5 as being in the vicinity of CD M, CD M may answer the call itself.

Figure 6:
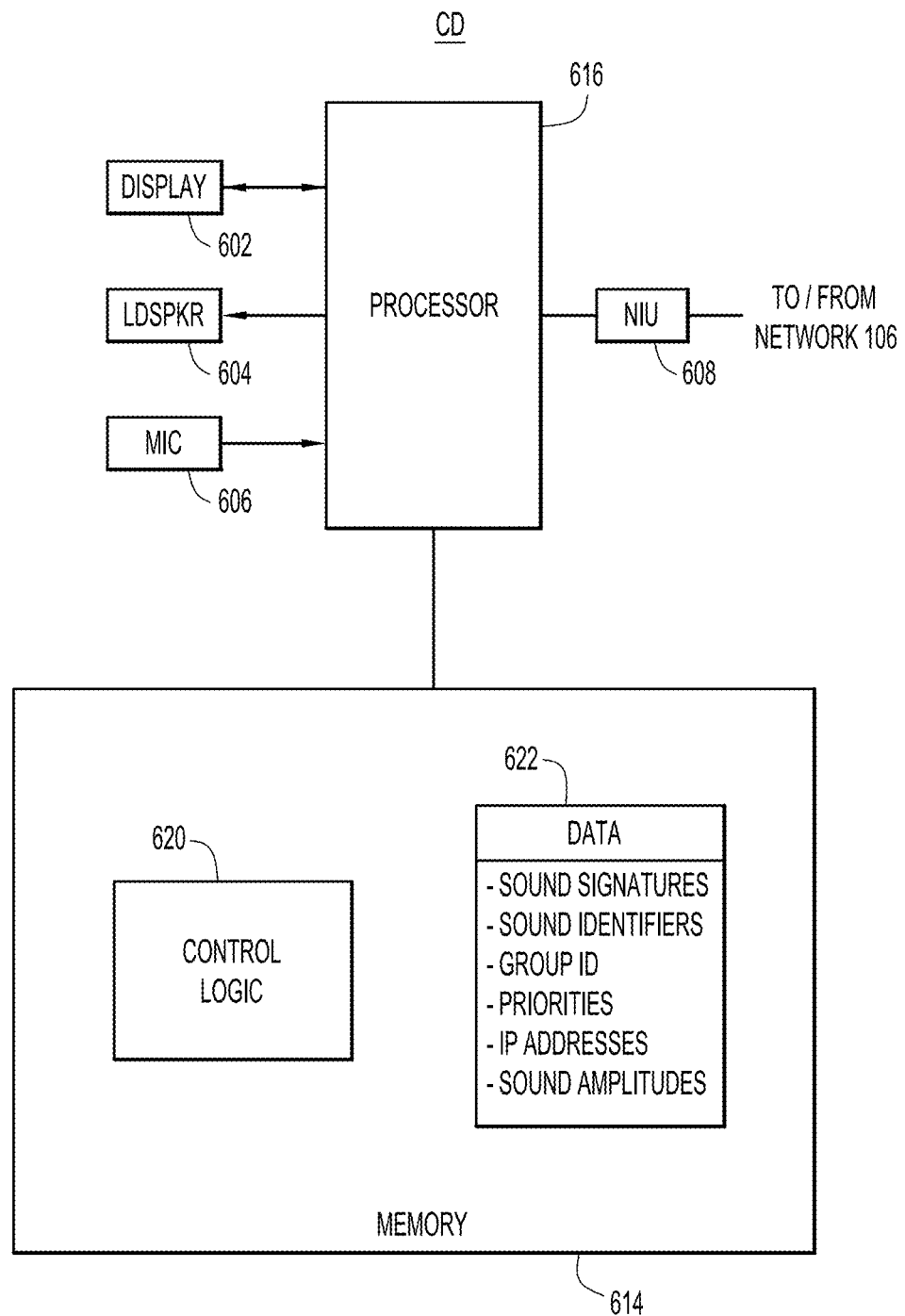
FIG. 6 is a block diagram of a communication device configured to participate in the techniques described herein, according to an example embodiment.

With reference to FIG. 6, there is a block diagram of an example CD 600 representative of any of CDs 104, M, and N1-N5. There are numerous possible configurations for CD 600 and FIG. 6 is meant to be an example. Examples of CD 600 include a tablet computer, a personal computer, a laptop computer, a mobile phone, such as a smartphone, or a video conference endpoint. CD 600 may include a display 602, a loudspeaker 604, a microphone 606, one or more network interface units (NIUs) 608, and memory 614 each coupled to a processor 616. The one or more NIUs 608 may include wired and/or wireless connection capability that allows processor 616 to communicate over communication network 106. For example, NIUs 608 may include an Ethernet card to communicate over an Ethernet connection, a wireless RF transceiver to communicate wirelessly with cellular networks in network 106, optical transceivers, and the like, as would be appreciated by one or ordinary skill in the relevant arts.

Processor 616 may include a collection of microcontrollers and/or microprocessors, for example, each configured to execute respective software instructions stored in the memory 614. The collection of microcontrollers may include, for example: a video controller to receive, send, and process video signals or images related to display 602; an audio processor to receive, send/transmit, and process audio/sound signals related to loudspeaker 604 and microphone 606 as described herein; and a high-level controller to provide overall control. Portions of memory 614 (and the instructions therein) may be integrated with processor 616. As used herein, the terms "audio" and "sound" are synonymous and interchangeable.

The memory 614 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 614 may comprise one or more computer readable storage media (e.g., a memory device) encoded with software comprising computer executable instructions and when the software is executed (by the processor 616) it is operable to perform the operations described herein. For example, the memory 614 stores or is encoded with instructions for control logic 620 to perform operations described herein to (i) cause CD 600 to transmit an audible sound identifier and a unique inaudible sound signature from loudspeaker 604 when appropriate, and/or (ii) perform proximity detection, i.e., detect unique inaudible sound signatures in a sound signal detected by microphone 606.

In addition, memory 614 stores data/information 622 used and generated by logic 620, including, but not limited to, one or more unique inaudible sound signatures, measured sound amplitudes (of detected sound), one or more CD group IDs, CD priorities associated with the group IDs, and various IP addresses of other CDs, call control servers, and central servers.

Figure 7:
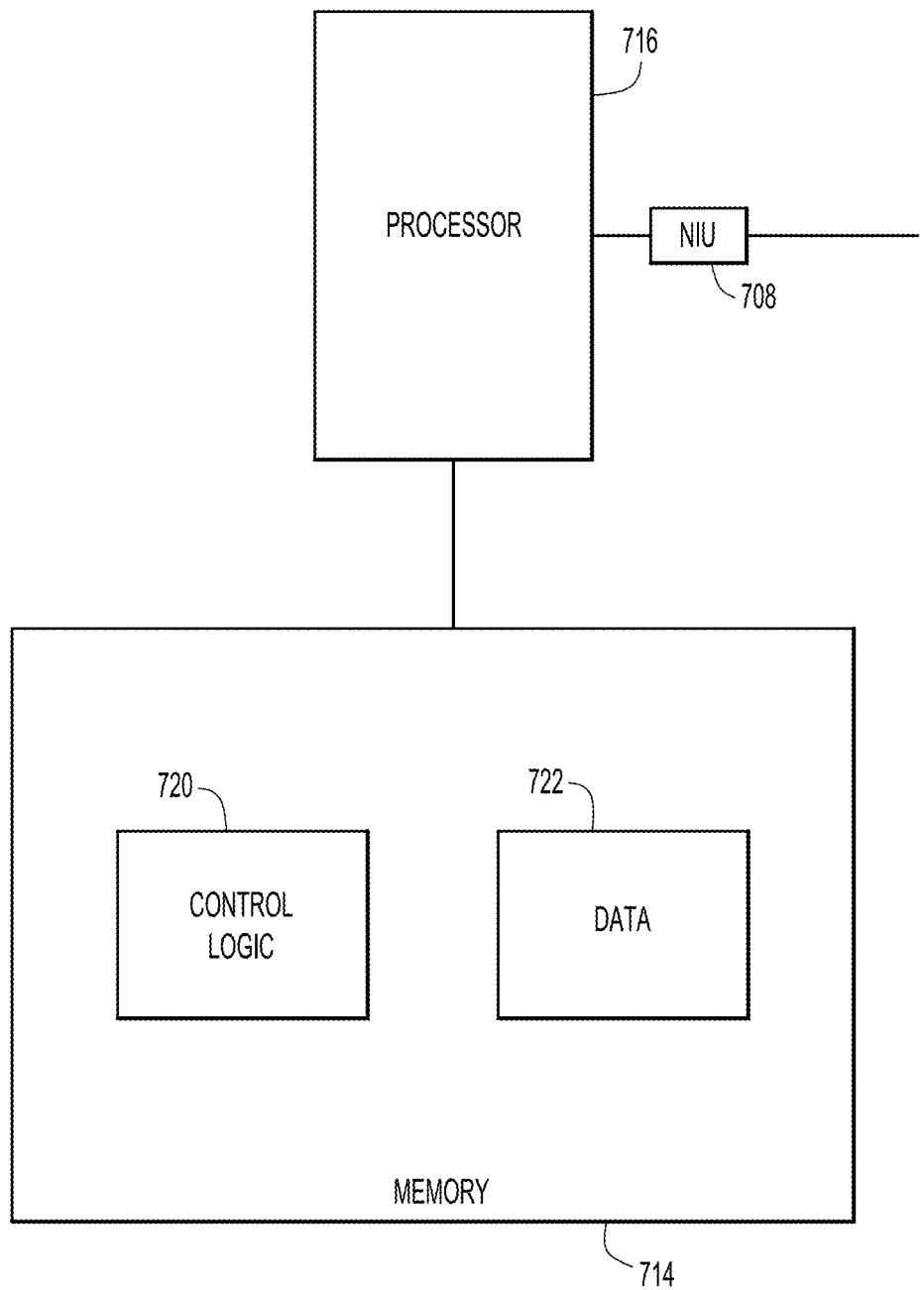
FIG. 7 is a block diagram of a computer system representative of the central server and a call control server in the system of FIG. 3, according to an example embodiment.

With reference to FIG. 7, there is a block diagram of an example computer system 700 representative of central server C and call control server S. Computer system 700 includes an NIU 708 (similar to NIU 608 described above) to connect with network 106 and a memory 714 each connected to a processor 716. Processor 716 may include a collection of microcontrollers and/or microprocessors, for example, each configured to execute respective software instructions stored in the memory 708. The memory 714 is similar to memory 614 described above. The memory 714 may comprise one or more computer readable storage media (e.g., a memory device) encoded with software comprising computer executable instructions and when the software is executed (by the processor 716) it is operable to perform the operations described herein. For example, the memory 714 stores or is encoded with instructions for control logic 720 to perform operations described herein with respect to central server C and call control server S.

In addition, memory 714 stores data/information 722 used and generated by logic 720. In the case of central server C, data 722 includes the user account database described above in connection with FIGS. 3 and 4. In the case of call control server S, data 722 includes information used to establish and tear-down calls across network 106.

In summary, embodiments presented herein optimize audio and video call control through proximity detection based on identification of sound in the frequency range of human hearing that is rendered auditorily imperceptible to casual listeners. Identification information is embedded in the audible sounds emitted by communication devices (such as media endpoints) so that the standard sound application programming interfaces (APIs) of both transmitting and detecting endpoint devices may be employed for both identification and proximity detection. In some embodiments, the identification information is embedded (as a sound signature) in the audio normally being output by the devices (such as when "ringing/alerting") or embedded in audio output not normally emitted by these devices (such as low-level noise) for use in proximity detection. As a result, these techniques have several advantages. They negate the need to use ultrasound for proximity detection, thus avoiding a number of problems associated with ultrasound, such as the inability of some devices to detect or transmit it or even receive it in the normal audio input stream (using, e.g., the Real-Time Transport Protocol (RTP)). Instead, sound that normally falls within the frequency range of human hearing is masked to be auditorily imperceptible and unobtrusive to human users. Further still, the full echo/noise control capabilities of the manufacturer-supplied APIs are maintained. Finally, these techniques allow for detection of proximity to third party devices, or any device that cannot be configured to emit any custom sound or ultrasound except a ringtone.

In summary, in one form, a method is provided comprising detecting sound with a microphone of the communication device to produce a sound signal representative of the sound; searching the sound signal for unique inaudible sound signatures associated with a group identifier, each sound signature identifying and assumed to be transmitted by a respective other communication device among a group of communication devices also associated with the group identifier, each sound signature being in an audible frequency band of human hearing but masked to be imperceptible to human hearing; and if any of the sound signatures are determined to be present in the sound signal, selecting a sound signature determined to be present in the sound signal based on predetermined criteria associated with the group identifier.

In another form, an apparatus is provided comprising: a microphone configured to convert detected sound into a sound signal; a transceiver configured to communicate with a communication network; and a processor coupled to the microphone and the transmitter, and configured to: search the sound signal for unique inaudible sound signatures associated with a group identifier, each sound signature identifying and assumed to be transmitted by a respective communication device among a group of communication devices also associated with the group identifier, each sound signature being in an audible frequency band of the human ear but masked to be imperceptible to the human ear; and if any of the sound signatures are determined to be present in the sound signal, select a found sound signature determined to be present in the sound signal based on predetermined criteria associated with the group identifier.

In yet another form, another method is provided comprising: configuring each communication device of a group of devices to play an audible ringtone having embedded therein a unique sound signature identifying the communication device, each sound signature being in an audible frequency band of human hearing but masked to be imperceptible to human hearing; receiving an incoming audio or video call directed to the group; sending a call announcement to all of the communication devices in the group; responsive to the call announcement, at each communication device playing the ringtone configured thereon to announce the incoming call; at a particular communication device in the group, listening for ringtones and, if any ringtones are detected, searching the detected ringtones for the embedded sound signatures; and if any of the sound signatures are detected, at the particular communication device, selecting one of the sound signatures that are detected and which identifies the communication device that is to answer the incoming call.

The above description is intended by way of example only. Various modifications and structural changes may be made therein without departing from the scope of the concepts described herein and within the scope and range of equivalents of the claims.

What is claimed is:

1. In a communication device, a method comprising:
   storing unique inaudible sound signatures that are in a frequency range of human hearing and that identify respective communication devices in a group of devices;
   detecting with a microphone of the communication device audible ringtones;
   receiving a call announcement for an incoming audio or video call from a communication network and that is directed to the group of devices;
   responsive to the call announcement, determining whether any of the inaudible sound signatures are embedded in any of the audible ringtones that are detected, by:
     correlating each audible ringtone with each inaudible sound signature to produce corresponding correlation amplitudes;
     searching the correlation amplitudes for peak amplitudes that exceed a threshold; and
     for each peak found to exceed the threshold, declaring a corresponding one of the inaudible sound signatures present;
   selecting one of the inaudible sound signatures determined to be present that identifies a communication device in the group of devices that is to answer the incoming call; and
   transmitting a message to the communication network indicating the identified communication device, in the group of devices, that is to answer the incoming call.

2. The method of claim 1,
   wherein the determining further includes determining whether any of the audible ringtones includes any of the inaudible sound signatures embedded in the audible ringtones by temporal masking or spectral masking.

3. The method of claim 1, wherein the transmitting the message to the communication network includes transmitting the selected inaudible sound signature.

4. The method of claim 1, further comprising:
   storing respective priorities of the communication devices in the group of devices, the priorities ranked from low to high; and
   when multiple inaudible sound signatures are determined to be present, each inaudible sound signature identifying a respective one of the communication devices in the group of devices, the selecting includes selecting the inaudible sound signature identifying the communication device having a highest priority among the communication devices identified by the inaudible sound signatures that are present.

5. The method of claim 1,
   when multiple inaudible sound signatures are determined to be present, each inaudible sound signature identifying a respective one of the communication devices in the group of devices, the selecting includes selecting the inaudible sound signature associated with a highest correlation amplitude among the multiple inaudible sound signatures that are determined to be present.

6. The method of claim 4, further comprising:
sorting a list of the communication devices identified by the multiple inaudible sound signatures determined to be present in accordance with the priorities; and
generating for display the sorted list of communication devices.

7. The method of claim 1, further comprising:
when none of the inaudible sound signatures are determined to be present in the audible ringtones, answering the call at the communication device.

8. An apparatus comprising:
a microphone configured to convert detected sound into a sound signal;
a transceiver configured to communicate with a communication network; and
a processor coupled to the microphone and the transmitter, and configured to:
store unique inaudible sound signatures that are in a frequency range of human hearing and that identify respective communication devices in a group of devices;
receive audible ringtones detected by the microphone;
receive a call announcement for an incoming audio or video call from the communication network and that is directed to the group of devices;
responsive to the call announcement, determine whether any of the inaudible sound signatures are embedded in any of the audible ringtones that are detected, by:
correlating each audible ringtone with each inaudible sound signature to produce corresponding correlation amplitudes;
searching the correlation amplitudes for peak amplitudes that exceed a threshold; and
for each peak found to exceed the threshold, declaring a corresponding one of the inaudible sound signatures present;
select one of the inaudible sound signatures determined to be present that identifies a communication device in the group of devices that is to answer the incoming call; and
transmit a message to the communication network indicating the identified communication device, in the group of devices, that is to answer the incoming call.

9. The apparatus of claim 8, wherein
the processor is configured to determine whether any of the audible ringtones includes any of the inaudible sound signatures embedded in the audible ringtones by temporal masking or spectral masking.

10. The apparatus of claim 8, wherein the message includes the selected inaudible sound signature.

11. The apparatus of claim 8, wherein the processor is further configured to:
store respective priorities of the communication devices in the group of devices ranked from low to high; and
when multiple inaudible sound signatures are determined to be present, each inaudible sound signature identifying a respective one of the communication devices, the processor is configured to select the inaudible sound signature identifying the communication device having a highest priority among the communication devices identified by the found sound signatures that are determined to be present.

12. The apparatus of claim 8, wherein the processor is further configured to:
when none of the inaudible sound signatures are determined to be present, answer the call with the apparatus.

13. A method comprising:
configuring each communication device of a group of devices to play an audible ringtone having embedded therein a unique inaudible sound signature identifying the communication device, each sound signature being in an audible frequency band of human hearing but masked to be imperceptible to human hearing;
receiving an incoming audio or video call directed to the group;
sending a call announcement to all of the communication devices in the group;
responsive to the call announcement, at each communication device playing the ringtone configured thereon to announce the incoming call;
at a particular communication device in the group, listening for ringtones and, if any ringtones are detected, determining whether any of the inaudible sound signatures are embedded in any of the audible ringtones that are detected, by:
correlating each audible ringtone with each inaudible sound signature to produce corresponding correlation amplitudes;
searching the correlation amplitudes for peak amplitudes that exceed a threshold; and
for each peak found to exceed the threshold, declaring a corresponding one of the inaudible sound signatures present;
selecting one of the inaudible sound signatures determined to be present that identifies a communication device in the group of devices that is to answer the incoming call; and
at the particular communication device, transmitting a message to a communication network indicating the identified communication device, in the group of devices, that is to answer the incoming call.

14. The method of claim 13,
wherein the message from the particular communication device identifies the selected inaudible sound signature and the communication device identified by the selected inaudible sound signature to cause that communication device to answer the call.

15. The method of claim 14, further comprising:
assigning respective priorities to the communication devices ranked from low to high, wherein when multiple inaudible sound signatures are determined to be present, the selecting includes selecting the inaudible sound signature identifying the communication device having a highest priority assigned thereto to answer the call.

16. The method of claim 14, further comprising:
when none of the inaudible sound signatures are determined to be present, answering the call at the particular communication device.

17. The method of claim 13, further comprising:
for each ringtone, spectrally masking the unique sound signature within the ringtone to produce the ringtone with the unique sound signature embedded therein.

18. The method of claim 13, further comprising:
for each ringtone, temporally masking the unique sound signature within the ringtone to produce the ringtone with the unique sound signature embedded therein.

* * * * *